United States Patent [19]

Shields

[11] 3,915,947

[45] Oct. 28, 1975

[54] DES-[HIS², GLY¹⁰]-D-ALA⁶ LHRH ETHYLAMIDE AS AN INHIBITOR OF LHRH

[75] Inventor: James E. Shields, Indianapolis, Ind.

[73] Assignee: Eli Lilly and Company, Indianapolis, Ind.

[22] Filed: July 11, 1974

[21] Appl. No.: 487,701

[52] U.S. Cl. ............................. 260/112.5; 424/177
[51] Int. Cl.² ................. C07C 103/52; A61K 37/00
[58] Field of Search .................. 260/112.5; 424/177

[56] References Cited
OTHER PUBLICATIONS

Coy et al.; Biochem. Biophys. Res. Comm., 57, 335–340, (1974).

Fujino et al.; Biochem. Biophys. Res. Comm., 57, 1248–1256, (1974).

Vale et al.; Science, 176, 933–934, (1972).

*Primary Examiner*—Lewis Gotts
*Assistant Examiner*—Reginald J. Suyat
*Attorney, Agent, or Firm*—William C. Martens, Jr.; Everet F. Smith

[57] ABSTRACT

A compound of the formula PyroGlu-Trp-Ser-Tyr-D-Ala-Leu-Arg-Pro-NHCH$_2$CH$_3$ as well as its pharmaceutically acceptable acid addition salts exhibit inhibiting action toward luteinizing hormone release hormone (LH-RH) and are potent contraceptives.

3 Claims, No Drawings

DES-[HIS², GLY¹⁰]-D-ALA⁶ LHRH ETHYLAMIDE AS AN INHIBITOR OF LHRH

Background and Summary of the Invention

The release of luteinizing hormone (LH) from the anterior pituitary gland is regulated by the hypothalamus by means of a substance designated alternatively as luteinizing hormone releasing hormone (LH-RH) or releasing factor (LH-RF). For purposes of clarity and consistency, the term "LH-RH" will be employed herein from this point forward and throughout when referring to this substance. Recently [H. Matsuo, Y. Baba, R. M. G. Nair, A. Arimura, and A. V. Schally, *Biochem. Biophys. Res. Commun.*, 43, 1334 (1971)], it has been established that LH-RH has the following structure:

PyroGlu-His-Trp-Ser-Tyr-Gly-Leu-Arg-Pro-Gly-NH₂
   1    2   3   4   5   6   7   8   9  10

A search has been under way for an extended period of time, and especially since the elucidation of the structure of LH-RH, to discover a compound or compounds which are antagonists of LH-RH and which therefore would be expected to exhibit useful contraceptive activity. The compounds which are the subject of this invention exhibit excellent activity in inhibiting the action of LH-RH and thus serve as useful contraceptives.

In the search for such compounds, several have been discovered which exhibit LH-RH activity, and some have been discovered which are active inhibitors of LH-RH.

Among these, Fujino, M. et al., *Biochem. Biophys. Res. Commun.*, 49, (1972), pp. 863–869, suggest that a nonapeptide compound differing in structure from LH-RH by elimination of the glycinamide in position 10 and amidification of the now terminal proline carboxyl to the N-ethylamide derivative exhibits approximately 3 times the activity of natural LH-RH.

Coy, D. W. et al., *J. Clin. End. Metab.*, 37 (1973), pp. 331–333, added to Fumino et al. the finding that the octapeptide differing from the Fujino et al. nonapeptide by elimination of the His in position 2 exhibits activity as an antagonist of LH-RH.

Monahan, M. W. et al., *Biochemistry*, 12 (1973), pp. 4616–4620, discovered that displacement of glycine in the position 6 of LH-RH by D-alanine (D-Ala) effects an increase in potency of 350–450% over that of natural LH-RH. Furthermore, these researchers discovered that both displacement of Gly⁶ by D-Ala and omission of His from position 2 resulted in an active inhibitor of LH-RH.

Most recently, Coy, D. H. et al., *Biochem. Biophys. Res. Commun.*, 57 (1974), pp. 335–340, discovered that a molecule differing from LH-RH by elimination of glycinamide (Gly-NH₂) at position 10, N-ethyl amidification of the resulting terminal proline carboxyl, and displacement of Gly⁶ by D-Ala exhibits activity approximately 30 times that of the natural hormone.

A new octapeptide which is highly active as an inhibitor of LH-RH has now been discovered, and it is to this octapeptide in the form of its free base as well as to the pharmaceutically acceptable acid addition salts thereof that this invention is directed.

Broadly, this invention is directed to a compound of the formula

L-PyroGlu-L-Trp-L-Ser-L-Tyr-D-Ala-L-Leu-L-Arg-L-Pro-NHCH₂CH₃ and its pharmaceutically acceptable acid addition salts.

This invention is also directed to novel compounds useful as intermediates in the preparation of the compounds of this invention, and include:
a compound of the formula R₁-D-Ala-L-Leu-L-(R)Arg-L-Pro-NHCH₂CH₃ in which R is nitro or tosyl; and R₁ is H-, tert-BOC-, tert-AOC-, AdOC-, CBz-, BPOC-, PNBOC-, or PMBOC-; and
a compound of the formula R₃-L-Trp-L-(Bzl)Ser-L-(R₂)Tyr-D-Ala-L-Leu-L-(R)Arg-L-Pro-NHCH₂CH₃, in which R is nitro or tosyl; R₂ is benzyl or 2,6-dichlorobenzyl; and R₃ is H-, tert-BOC-, PMBOC-, BPOC-, or R₄-L-Pyro-Glu- in which R₄ is H-, CBz-, or PMBOC-.

Detailed Description of the Invention

The compounds of this invention can be prepared by a systematic building of the particular peptide sequence. One method which is available can be illustrated by the following sequences of schemes:

Scheme A

```
CBz-L-Pro + Et-NH₂
    ↓ IBCF
    ↓ NMM
CBz-L-Pro-NHEt
    ↓ TSA
    ↓ H₂, Pd/C
L-Pro-NHEt.TSA
    ↓ TEA
    ↓ HOBT, DCC
       CBz-L-Arg(NO₂)
CBz-L-Arg(NO₂)-L-Pro-NHEt
    ↓ HBr,
    ↓ TFA
L-Arg(NO₂)-L-Pro-NHEt.HBr
    ↓ TEA
       tert-BOC-L-Leu(PNP)
tert-BOC-L-Leu-L-Arg(NO₂)-L-Pro-NHEt
       TSA, TES
L-Leu-L-Arg(NO₂)-L-Pro-NHEt.TSA
       TEA
    ↓ HOBT, DCC
       tert-BOC-D-Ala
tert-BOC-D-Ala-L-Leu-L-Arg(NO₂)-L-Pro-NHEt
    ↓ TFA, TES
    ↓ HCO₃⁻
D-Ala-L-Leu-L-Arg(NO₂)-L-Pro-NHEt        (I)
```

Scheme B

```
tert-BOC-L-Ser(O-Bzl) + L-Tyr (O-Bzl)(Me).HCl
    ↓ TEA
    ↓ HOBT, DCC
tert-BOC-L-Ser(O-Bzl)-L-Tyr-(O-Bzl)(Me)
    ↓ TSA
L-Ser(O-Bzl)-L-Tyr(O-Bzl)(Me).TSA
    ↓ TEA
    ↓ HOBT, DCC
       tert-BOC-L-Trp
tert-BOC-L-Trp-L-Ser(O-Bzl)-L-Tyr(O-Bzl)(Me)
    ↓ LiOH
tert-BOC-L-Trp-L-Ser(O-Bzl)-L-Tyr(O-Bzl)
```

Scheme C

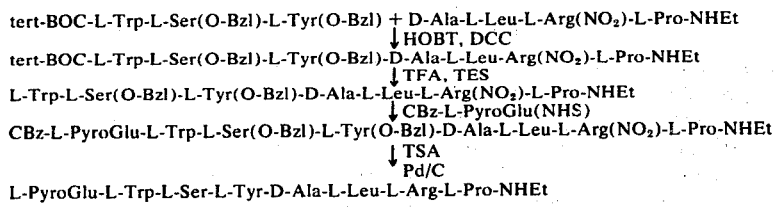

tert-BOC-L-Trp-L-Ser(O-Bzl)-L-Tyr(O-Bzl) + D-Ala-L-Leu-L-Arg(NO₂)-L-Pro-NHEt
↓ HOBT, DCC
tert-BOC-L-Trp-L-Ser(O-Bzl)-L-Tyr(O-Bzl)-D-Ala-L-Leu-Arg(NO₂)-L-Pro-NHEt
↓ TFA, TES
L-Trp-L-Ser(O-Bzl)-L-Tyr(O-Bzl)-D-Ala-L-Leu-L-Arg(NO₂)-L-Pro-NHEt
↓ CBz-L-PyroGlu(NHS)
CBz-L-PyroGlu-L-Trp-L-Ser(O-Bzl)-L-Tyr(O-Bzl)-D-Ala-L-Leu-L-Arg(NO₂)-L-Pro-NHEt
↓ TSA
   Pd/C
L-PyroGlu-L-Trp-L-Ser-L-Tyr-D-Ala-L-Leu-L-Arg-L-Pro-NHEt The man skilled in the art will well recognize that various modifications to the above delineated sequence can be made without departing from the spirit of the teaching. Such modifications include, for example, the interchangeability of recognized protecting groups as well as the use of particular methods of peptide coupling and deblocking.

In the specification and claims, the following abbreviations, most of which are well known and commonly used in the art, are employed:

Ala — Alanine
Arg — Arginine
Gly — Glycine
His — Histidine
Leu — Leucine
Pro — Proline
PyroGlu — Pyroglutamic acid
Trp — Tryptophan
Tyr — Tyrosine
CBz — Benzyloxycarbonyl
tert-BOC — tert-Butyloxycarbonyl
tert-AOC — tert-Amyloxycarbonyl
BPOC — Biphenylisopropyloxycarbonyl
PNBOC — p-Nitrobenzyloxycarbonyl
PMBOC — p-Methoxybenzyloxycarbonyl
t-Bu — tert-Butyl
Bzl — Benzyl
Et — Ethyl
Me — Methyl
BSA — Benzenesulfonic acid
TS — Tosyl
TSA — p-Toluenesulfonic acid
TFA — Trifluoroacetic acid
AdOC — Adamantyloxycarbonyl
NHS — N-Hydroxysuccinimido
DMF — N,N-Dimethylformamide
TES — Triethylsilane
DMSO — Dimethyl sulfoxide
TFE — Trifluoroethanol
HOBT — 1-Hydroxybenzotriazole
DCC — N,N′-dicyclohexylcarbodiimide
DCB — 2,6-Dichlorobenzyl
IBCF — Isobutyl chloroformate
TEA — Triethylamine
PNP — p-Nitrophenyl
PNB — p-Nitrobenzyl
PCP — Pentachlorophenyl
NMM — N-Methylmorpholine
AcOH — Acetic acid The synthesis of the compounds of this invention involves coupling of amino acids or peptide fragments by reaction of the carboxyl function of one with the amino function of another to produce an amide linkage. In order to realize the coupling, it is essential, first, that all reactive functionalities not participating directly in the reaction be inactivated by appropriate blocking groups, and, secondly, that the carboxyl function which is to be coupled be appropriately activated to permit coupling to proceed. All of this involves a careful selection of both reaction sequence and reaction conditions as well as utilization of specific blocking groups so that the desired ultimate peptide will be realized. Each of the amino acids employed to produce the compounds of this invention and having the particularly selected protecting groups and/or activating functionalities is prepared by employing techniques well recognized in the peptide art.

Specific blocking groups are employed at each point in the total synthesis of the compounds of this invention. These particular blocking groups have been found to function most smoothly. Other groups may indeed be satisfactory in the total synthesis although perhaps with less efficiency. Thus, for example, benzyloxycarbonyl (CBz), t-butyloxycarbonyl (tert-BOC); t-amyloxycarbonyl (tert-AOC), p-methoxybenzyloxycarbonyl (PMBOC), p-nitrobenzyloxycarbonyl (PNBOC), biphenylisopropyloxycarbonyl (BPOC), and adamantyloxycarbonyl (AdOC) can be variously employed as N-blocking groups at selected points in the synthesis. Furthermore, benzyl (bzl) or 2,6-dichlorobenzyl (DCB) are employed as hydroxy-protecting groups even though others, such as tert-butyl (t-Bu), could well be employed.

In rendering the carboxyl function active to the coupling reaction, at least two separate, well-recognized techniques are employed at various points in the total synthesis of the compounds of this invention. One such activation technique which is employed at particular points in the synthesis involves the conversion of the carboxyl function to a mixed anhydride. The free carboxyl function is activated by reaction with another acid, typically a derivative of carbonic acid, such as, for example, an acid chloride. Examples of acid chlorides used to form mixed anhydrides are formate, isobutyl chloroformate, pivaloyl chloroformate, and the like.

Another method of activating the carboxyl function for the coupling reaction is by conversion to its active ester derivative. Such active esters include, for example, a 2,4,5-trichlorophenyl ester, a pentachlorophenyl (PCP) ester, a p-nitrophenyl (PNP) ester, an ester formed from 1-hydroxybenzotriazole (HOBT), and an ester formed from N-hydroxysuccinimide (NHS).

Carboxyl blocking groups which can be used in preparing the compounds of this invention can be any of the typical ester-forming groups, including, for example, $C_1-C_4$ alkyl, such as methyl, ethyl, and tert-butyl, benzyl, p-nitrobenzyl (PNB), p-methoxybenzyl, 2,2,2-trichloroethyl, and the like. These can be readily removed by alkaline saponification. Relatively strong alkaline conditions, typically an alkaline metal hydroxide, such as sodium hydroxide, potassium hydroxide, lithium hydroxide, and the like, are generally employed to deesterify the protected carboxyl under reaction conditions well recognized in the art. Highly preferred for use is lithium hydroxide. In those instances in which the carboxyl blocking group is p-nitrobenzyl, deblocking can be accomplished by reduction in the presence of zinc and hydrochloric acid.

The nitrogen blocking groups are cleaved in the presence of acid such as HBr, HCl, trifluoroacetic acid, p-toluenesulfonic acid, benzenesulfonic acid, naphthylenesulfonic acid, acetic acid, and the like, to form the respective acid addition salt products. The cleavage can also be accomplished by hydrogenation in the presence of a catalyst such as palladium on carbon. Since this latter method may result in cleavage of more than merely the intended N-blocking group, its use remains rather limited. Another method which is available for accomplishing cleavage of the nitrogen blocking group involves the use of boron trifluoride. For example, boron trifluoride diethyl etherate in glacial acetic acid will convert the nitrogen-protected peptide to a $BF_3$ complex which then can be converted to the deblocked peptide by treatment with base, such as aqueous potassium bicarbonate.

The final step to preparing the compounds of this invention involves cleavage of the blocking groups present on the final intermediate. This can be accomplished by hydrogenation in the presence of a catalyst, typically palladium on carbon, and an acid suitable for formation of a pharmaceutically acceptable salt. Such acids include, for example, inorganic acids, such as HCl, HBr, and the like, organic acids, such as carboxylic acids, including acetic acid, propionic acid, and the like, sulfonic acids, including p-toluenesulfonic acid (TSA), benzenesulfonic acid (BSA), naphthalenesulfonic acid, and the like. Cleavage can also be accomplished by treating the intermediate with liquid HF in the presence of anisole and a sulfide, such as methyl ethyl sulfide, evaporating the excess HF, dissolving the product in a solution of the selected pharmaceutically acceptable acid, and lyophilizing to produce the pharmaceutically acceptable acid addition salt. The compound can be isolated in the form of its free base, although it is preferred that it be isolated as a pharmaceutically acceptable acid addition salt.

The particular methods of coupling, blocking, and cleavage employed in preparing the compounds of this invention are each now well recognized in the art. The conditions under which a particular coupling, blocking, or cleavage reaction would be carried out will be apparent to those skilled in the art.

Illustrative of the compounds which are a part of this invention and which are useful as intermediates in the preparation of the biologically active compounds of this invention are the following:

H-D-Ala-L-Leu-L-($NO_2$)Arg-L-Pro-NHEt;
H-D-Ala-L-Leu-L-(TS)Arg-L-Pro-NHEt;
tert-BOC-D-Ala-L-Leu-L-(TS)Arg-L-Pro-NHEt;
tert-AOC-D-Ala-L-Leu-L-($NO_2$)Arg-L-Pro-NHEt;
AdOC-D-Ala-L-Leu-L-($NO_2$)Arg-L-Pro-NHEt;
CBz-D-Ala-L-Leu-L-($NO_2$)Arg-L-Pro-NHEt;
BPOC-D-Ala-L-Leu-L-(TS)Arg-L-Pro-NHEt;
PNBOC-D-Ala-L-Leu-L-($NO_2$)Arg-L-Pro-NHEt;
PMBOC-D-Ala-L-Leu-L-($NO_2$)Arg-L-Pro-NHEt;
H-L-Trp-L-(Bl)Ser-L-(DCB)Tyr-D-Ala-L-Leu-L-($NO_2$)Arg-L-Pro-NHEt;
tert-BOC-L-Trp-L-(Bzl)Ser-L-(DCB)Tyr-D-Ala-L-Leu-L-(TS)Arg-L-Pro-NHEt;
PMBOC-L-Tep-L-(Bzl)Ser-L-(BZ)Tyr-D-Ala-L-Leu-L-($NO_2$)Arg-L-Pro-NHEt;
BPOC-L-Trp-L-(Bzl)Ser-L-(Bzl)Tyr-D-Ala-L-Leu-L-($NO_2$)Arg-L-Pro-NHEt;
H-L-PyroGlu-L-Trp-L-(Bzl)Ser-L-(Bzl)Tyr-D-Ala-L-Leu-L-($NO_2$)Arg-L-Pro-NHEt;
CBz-L-PyroGlu-L-Trp-L-(Bzl)Ser-L-(DCB)Tyr-D-Ala L-Leu-L-($NO_2$)-Arg-L-Pro-NHEt;
PMBOC-L-PyroGlu-L-Trp-L-(Bzl)Ser-L-(Bzl)Tyr-D-Ala-L-Leu-L-(TS)-Arg-L-Pro-NHEt; and the like.

The inhibitory activity of the compounds of this invention is determined by placing hemisected anterior pituitaries, removed from mature male rats, into 10 ml. culture tubes each containing 2 ml. of commercially available Medium 199. Two pituitary halves are placed into each of two tubes, and the two tubes comprise a paired unit. One tube serves as the control, and the compound is added to the other tube. Before addition of any compound the pituitaries are preincubated in 2 ml. of Medium 199 for 1 hour at 37°C. in a Dubnoff metabolic shaker. At the end of one hour the preincubation medium is discarded, fresh medium containing 10 nanograms (ng.) of natural LH-RH is added to the control tube, and fresh medium containing 10 ng. of natural LH-RH and 10 µg. of test compound is added to the experimental tube. All volumes are 2.0 ml. The tube pairs are incubated for an additional 4 hours, whereupon the medium in each is collected and assayed for LH by radioimmunoassay.

Due to their activity in inhibiting LH-RH, the compounds of this invention can be used to inhibit or prevent conception in humans or animals, particularly farm animals. Administration of the compounds of this invention can be oral or parenteral. In oral administration a timed release is preferred to ensure that the compound reaches the intestine intact. Administration can also be by any of the other usual routes, including, for example, intraperitoneal, intramuscular, subcutaneous, and sublingual.

Generally, the compound will be administered to a female subject in a single dose or multiple cumulative doses in an amount sufficient to achieve inhibition of LH-RH which in turn will have the effect of retarding release of LH.

The dose level is such as is sufficient to achieve inhibition of LH-RH at the level desired and generally will be from about 0.01 to about 100 micrograms.

The following examples are provided for the purpose of illustrating the preparation and activity of the compounds of this invention and are not intended to be limiting upon the scope thereof.

EXAMPLE 1

Benzyloxycarbonyl-L-Proline-N-Ethylamide

A solution of 51.23 g. (197.7 mmol.) of benzyloxycarbonyl-L-proline in 800 ml. of tetrahydrofuran was cooled to about −15°C. To this solution were added with stirring 20.65 ml. (188 mmol.) of N-methylmorpholine and 24.59 ml. (188 mmol.) of isobutyl chloroformate. Stirring was continued for 30 minutes, and monoethylamine (dried through a sodium hydroxide trap) was bubbled through the solution for 30 minutes. The solution was maintained at −20°C. overnight. To the reaction mixture were added 400 ml. of aqueous 5% sodium bicarbonate solution. The mixture was stirred for 30 minutes. The tetrahydrofuran was evaporated in vacuo. The residue was dissolved in ethyl acetate, and the ethyl acetate solution was washed with 5% sodium bicarbonate, water, 5% citric acid, water, 5% sodium bicarbonate, and water. The ethyl acetate solution was dried over sodium sulfate, filtered through glass wool, and evaporated in vacuo. The solid was crystallized from a mixture of ethyl acetate and pentane, filtered, washed with pentane, and dried in vacuo to obtain 42.13 g. (77.5%) of product, m.p. 106°–107°C., $[\alpha]_D = -70.5°$ (c = 1.24, TFE); $[\alpha]_D = -25.0°$ (c = 0.83, DMF).

Analysis Calcd. for $C_{15}H_{20}N_2O_3$ (276.326): C, 65.20; H, 7.30; N, 10.14; O, 17.37. Found: C, 65.08; H, 7.27; N, 10.38; O, 17.66.

EXAMPLE 2

L-Proline-N-Ethylamide, p-toluenesulfonate salt

To a solution of 40.0 g. (145.0 mmol.) of benzyloxycarbonyl-L-proline-N-ethylamide and 27.6 g. (145.0 mmol.) of p-toluenesulfonic acid monohydrate in 500 ml. of 95% ethanol were added 4.0 g. of 5% palladium on carbon suspended in 25 ml. of 95% ethanol. The system was purged with nitrogen, and hydrogen then was bubbled through the stirred suspension for 10 hours at room temperature. The system again was purged with nitrogen, and the palladium on carbon was filtered from the ethanol. The filtrate was evaporated to a small volume, and ether was added to precipitate the product as in oil. The oil was triturated three times with ether. After all attempts at crystallization failed, the product was dried in vacuo at 50°C. to a viscous syrup (42.8 g.).

EXAMPLE 3

Benzyloxycarbonyl-L-Nitroarginyl-L-Proline-N-Ethylamide

A solution of 17.49 g. (54.3 mmol.) of L-proline-N-ethylamide, p-toluenesulfonate salt, 12.15 g of (36.2 mmol.) of benzyloxycarbonyl-L-nitroarginine, and 4.89 g. (36.2 mmol.) of 1-hydroxybenzotriazole in 150 ml. N,N-dimethylformamide was cooled to −15°C. To the cooled solution were added 7.55 ml. (54.3 mmol.) of triethylamine and 11.2 g. (54.3 mmol.) of N,N′-dicyclohexylcarbodiimide. The reaction mixture was kept at 3°C. overnight. To the mixture were added 24 ml. of a 2:1:3 mixture of pyridine, acetic acid, and water. The resulting mixture was warmed for 30 minutes in a water bath and then was cooled to −15°C. The dicyclohexylurea by-product was removed by filtration and washed with cold, N,N-dimethylformamide which was added to the filtrate. The filtrate was evaporated in vacuo. The residual oil was dissolved in ethyl acetate. The ethyl acetate solution was washed successively with water, 5% citric acid (3 times), water, 2N potassium bicarbonate (3 times) and water (twice). Each aqueous phase was backwashed with 2 small portions of ethyl acetate, and the backwashes were combined with the original ethyl acetate solution. The ethyl acetate phase was dried over sodium sulfate and evaporated in vacuo. During the evaporation, product separated as a solid particulate gel. The gel was cooled to −15°C., filtered, and pressed as free as possible of excess ethyl acetate. The gel was redissolved in warm ethyl acetate, and the solution was cooled to 3°C. Water was added with stirring to initiate gel formation. The ethyl acetate gel mixture was cooled at −15°C. overnight. The gel was broken up, removed by filtration, and pressed free of excess solvent. The gel was dried at room temperature in a vacuum dessicator overnight, pulverized, and dried in vacuo at 40°C. for an additional 24 hours to obtain 12.60 g. (73%) of product, m.p. 79°–84°C. (amorphous); $[\alpha]_D = -55.8°$ (c = 0.533 TFE); $[\alpha]_D = -21.3°$ (c = 0.644 DMF)

Analysis Calcd. for $C_{21}H_{31}N_7O_6$ (477.52): C, 52.82; H, 6.54; N, 20.53; O, 20.10. Found: C, 52.68; H, 6.41; N, 20.25; O, 20.29.

EXAMPLE 4

L-Nitroarginyl-L-Proline-N-Ethylamide, Hydrobromide Salt

Hydrogen bromide (passed through a red phosphorous trap) was bubbled through a solution of 13.6 g. (28.5 mmol.) of benzyloxycarbonyl-L-nitroarginyl-L-proline-N-ethylamide in 90 ml. trifluoroacetic acid, 10 ml. anisole, and 10 ml. triethylsilane for 45 minutes. The resulting reaction mixture was poured into ether to precipitate the product. The mixture containing a precipitate was cooled to −15°C. and filtered, and the filter cake was washed with ether. The precipitate was dissolved in warm 95% ethanol, cooled to −15°C., and reprecipitated with cold (−15°C.) ether. The product kept overnight at −15°C. The mixture then was filtered, and the filter cake was washed with ether and dried in vacuo at 40°C. to obtain 11.47 g. (94.8%) of product, m.p. 120°–145°C. (amorphous) $[\alpha]_D = -53.6$ (C = 0.277, TFE), $[\alpha]_D = -11.4°$ (c = 0.389, DMF)

Analysis Calcd. for $C_{13}H_{26}N_7O_4$ (424.300): C, 36.80; H, 6.18; N, 23.11; O, 15.08; Br, 18.83. Found: C, 37.04; H, 6.77.

EXAMPLE 5 t-Butyloxycarbonyl-L-Leucyl-L-Nitroarginyl-L-Proline-N-Ethylamide

To a solution of 14.75 g. (34.8 mmol.) of L-nitroarginyl-L-proline-N-ethylamide hydrobromide and 12.25 g. (34.8 mmol.) of t-butyloxycarbonyl-L-leucine p-nitrophenyl ester in 75 ml. N,N-dimethylformamide were added 4.84 ml. (34.8 mmol.) of triethylamine. The reaction mixture was allowed to stand for 72 hours at room temperature. The mixture was cooled to −15°C., and triethylammonium bromide was removed by filtration and washed with a small volume of cold N,N-di-methylformamide. Ethyl acetate was added to the filtrate. The mixture was washed with 2N potassium bicarbonate, and a large amount of the product crystallized. The crystals were filtered and washed with water and then ethyl acetate. The ethyl acetate filtrate was washed successively with 2N potassium bicarbonate (twice), water, 5% citric acid (twice), and water (twice). The ethyl acetate then was dried over sodium sulfate and evaporated in vacuo until product began to crystallize. The mixture was cooled to 3°C. and maintained thereat for a few hours, filtered, and the filtered solid was washed with ethyl acetate. The two portions of crystals were combined and dissolved in a minimum volume of 95% ethanol, and the solution was diluted with a large volume of ethyl acetate. Crystallization began immediately. The mixture was cooled to 3°C. overnight and filtered. The solid was washed with cold ethyl acetate and dried in vacuo at 40°C. to obtain 15.76 g. (81.3%) or product, m.p. 127°–130°C., $[\alpha]_D = -73.0°$ (c = 0.773 TFE), $[\alpha]_D = -42.9°$ (c = 0.821 DMF)

Analysis Calcd. for $C_{24}H_{44}N_8O_7$ (556.665): C, 51.78; H, 7.97; N, 20.13; O, 20.12. Found: C, 51.81; H, 7.65; N, 19.94; O, 20.02.

EXAMPLE 6

L-Leucyl-L-Nitroarginyl-L-Proline-N-Ethylamide p-toluenesulfonic acid salt

A solution of 17.67 g. (31.7 mmol.) of t-butyloxycarbonyl-L-leucyl-L-nitroarginyl-L-proline-N-ethylamide and 24.20 g. (127 mmol.) of p-toluenesulfonic acid monohydrate in a mixture of 225 ml. acetonitrile and 25 ml. triethylsilane was prepared and allowed to stand 1.5 hours at room temperature. Product crystallized from the reaction mixture. The mixture then was cooled for 30 minutes at 3°C. and filtered. The filtered solid was washed with cold acetonitrile. The solid was recrystallized from a mixture of 95% ethanol and ether, washed successively with a 1:1 mixture of ethanol and ether, ether, and then dried in vacuo at 40°C. to produce 18.81 g. (91.5%) of product, m.p. 213°–216°C. with decomposition; $[\alpha]_D = -39.4°$ (c = 0.943 TFE), $[\alpha]_D = -10.2°$ (c = 0.960 DMF)

Amino acid analysis: Calc. 159 µmol./mg; Found, Leu 1.47; Arg 1.44; Pro 1.59.

Analysis Calcd. for $C_{26}H_{44}N_8O_8S$ (628.750): C, 49.67; H, 7.05; N, 17.82; O, 20.36; S, 5.10. Found: C, 49.45; H, 7.06; N, 17.63; O, 20.60; S, 5.32.

EXAMPLE 7 t-Butyloxycarbonyl-D-Alanyl-L-Leucyl-L-Nitroarginyl-L-Proline-N-Ethylamide

To a solution of 6.288 g. (10 mmol.) of L-leucyl-L-nitroarginyl-L-proline-N-ethylamide, p-toluenesulfonic acid salt in 19 ml. of N,N-dimethylformamide were added 1.39 ml. (10 mmol.) of triethylamine. The mixture was stirred at room temperature for a few minutes. To the solution were added 1.892 g. (10 mmol.) of t-butyloxycarbonyl-D-alanine and 1.350 g. (10 mmol.) of 1-hydroxybenzotriazole in 4 ml. of N,N-dimethylformamide. The resulting solution was cooled to −15°C.

To the cold solution were added 2.682 g. (13 mmol.) of N,N'-dicyclohexylcarbodiimide in 3 ml. of cold N,N-dimethylformamide. The mixture was maintained at 5°C. for 119 hours. The resulting insoluble material was removed by filtration and discarded. To the filtrate were added 16 ml. of a 2:1:3 mixture of pyridine, acetic acid, and water. After stirring at room temperature, the mixture was cooled to −15°C. More insoluble material was removed by filtration and discarded. Ether was added, and an oil separated. The supernatant was decanted, and the oil was dissolved in ethyl acetate. The ethyl acetate solution was washed with a small amount of water. The ethyl acetate phase was separated, dried, and evaporated in vacuo. The resulting oil was dissolved in acetonitrile and chilled. Product was precipitated by addition of ether, collected with cold ether, and dried in vacuo. Yield of pure product was 3.26 g. (52%), m.p. 124–136°C. (dec.).

Analysis Calcd. for $C_{27}H_{49}H_9O_8$: C, 51.66; H, 7.87; N, 20.08, O, 20.39. Found: C, 51.38; H, 7.69; N, 19.95; O, 20.27.

Amino Acid Analysis (Based on Leucine = 1) Found: Ala 1.08; Leu 1; Arg 0.85; Pro 1.18.

EXAMPLE 8

D-Alanyl-L-Leucyl-L-Nitroarginyl-L-Proline-N-Ethylamide

A suspension of 1.883 g. (3 mmol.) of t-butyloxycarbonyl-D-alanyl-L-leucyl-L-nitroarginyl-L-proline-N-ethylamide in 24 ml. of an 8:1:1 mixture of trifluoroacetic acid, triethylsilane, and methylene chloride was stirred at room temperature for 40 minutes during which time solution resulted. The solution was evaporated in vacuo to an oil. Trituration with ether resulted in a white solid which was collected with ether and air dried.

The solid was dissolved in N,N-dimethylformamide. Addition of 2N potassium bicarbonate and water failed to produce a precipitate. The solution was evaporated in vacuo, and the residue was dissolved in methanol. A slight amount of insoluble material was filtered and discarded. Crude product was precipitated from the filtrate by addition of ether. The solid was recrystallized from cold 95% ethanol (discarding ethanol-insoluble material) by addition of ether. Product was collected with cold ether while maintaining the mixture at a low temperature. The solid was then dried in vacuo. Thin layer chromatography by 2 different systems indicated that the product was one spot material and that no starting material remained. Yield of pure product was 1.223 g. (80%), m.p. 129.5°–135.5°C. (dec.)

Amino Acid Analysis (Based on Leucine = 1) Found: Ala 1.05; Leu 1; Arg 0.85; Pro 1.19.

EXAMPLE 9 t-Butyloxycarbonyl-L-(O-Benzyl)Seryl-L-(O-Benzyl-Tyrosine, Methyl Ester

To a suspension of 12.34 g (38.35 mmol.) of L-(O-benzyl)tyrosine methyl ester hydrochloride, 11.34 g (38.40 mmol.) of t-butyloxycarbonyl-L-(O-benzyl)serine, and 5.55 g. (41 mmol.) of 1-hydroxybenzotriazole in 160 ml. of N,N-dimethylformamide were added 5.3 ml. (38.5 mmol.) of triethylamine. The mixture was cooled to 3°C., and 9.90 g. (48.0 mmol.) of N,N'-dicyclohexylcarbodiimide were added. The mixture was allowed to stand at 3°C. overnight, at room temperature for 1.5 hours, and then it was cooled to −15°C. The resulting dicyclohexylurea was removed by filtration. Aqueous potassium bicarbonate was added to the filtrate, and a solid precipitated. The solid was filtered, washed with water, and recrystallized from a mixture of 500 ml. of 95% ethanol (hot) and 150 ml. of water. The mixture was cooled to 3°C. during crystallization and allowed to stand overnight. The solid was filtered, washed with cold ethanol, and dried in vacuo at 30°C. to obtain 19.81 g. (91.8%) of product, m.p. 117.5°–120.5°C. The product again was recrystallized from a mixture of 400 ml. of 95% ethanol and 120 ml. of water to give 18.99 g. (88.0%) of product, m.p. 118°–120°C. $[\alpha]_D = +19.7$ (c = 1.132 TFE); $[\alpha]_D = +6.6°$ (c = 0.911 DMSO); $[\alpha]_D = +1.0°$ (c = 1.172 DMF)

Analysis Calcd. for $C_{32}H_{38}N_2O_7$ (562.663): C, 68.31; H, 6.81; N, 4.98. Found: C, 68.07; H, 6.70; N, 4.72.

EXAMPLE 10

L-(O-Benzyl)Seryl-L-(O-Benzyl)Tyrosine, Methyl Ester, p-Toluenesulfonate

A solution of 18.44 g. (32.77 mmol.) of t-butyloxycarbonyl-L-(O-benzyl)seryl-L-(O-benzyl)tyrosine methyl ester and 19.99 g (105.1 mmol.) of p-toluenesulfonic acid monohydrate in a mixture of 300 ml. of acetonitrile and 30 ml. triethylsilane was allowed to stand for 1.5 hours at room temperature. The solution then was concentrated in vacuo. Ether was added to the concentrate until it became cloudy. A small amount of ethanol then was added, and crystals formed. The mixture was cooled and filtered, and the filter cake was washed twice with ether. The crystals were air dried and then were dissolved in 250 ml. of warm 95% ethanol. The solution was cooled, and 250 ml. of ether was added. Product crystallized, and the mixture was stored at −15°C. and then filtered. The solid was washed with ether and dried in vacuo at 40°C. to give 12.23 g. (58.8%) of product, m.p. 159°–161°C. $[\alpha]_D = +1.6°$ (c = 0.735 DMSO); $[\alpha]_D = +6.3°$ (c = 0.773 DMF); $[\alpha]_D = +3.6°$ (c = 0.715 TFE)

Analysis Calcd. for $C_{34}H_{38}N_2O_8S$ (634.748): C, 64.34; H, 6.03; N, 4.41; S, 5.05. Found: C, 63.55; H, 5.74; N, 3.93; S, 5.01.

EXAMPLE 11 t-Butyloxycarbonyl-L-Tryptophyl-l-(O-Benzyl)-Seryl-L-(O-Benzyl0Tyrosine, Methyl Ester A solution of 12.08 g. (19.03 mmol.) of L-(O-benzyl)-seryl-L-(0-benzyl)tyrosine methyl ester p-toluenesulfonate, 5.81 g. (19.09 mmol.) of t-butyloxycarbonyl-L-tryptophan, and 2.57 g. (19.03 mmol.) of 1-hydroxybenzotriazole in 82 ml. N,N-dimethylformamide was cooled to 3°C., and 2.65 ml. (19.03 mmol.) of triethylamine and 5.30 g. (25.7 mmol.) of N,N'-di-cyclohexylcarbodiimide then were added. The resulting mixture was stored at 3°C. for 48 hours and then at room temperature for 30 minutes. To the mixture were then added 6 ml. of a 2:1:3 mixture of pyridine, acetic acid, and water, and the resulting mixture was maintained for 1 hour in a warm water bath. The mixture then was cooled to −15°C. and filtered. Aqueous potassium bicarbonate was added to the filtrate, and an oil separated. The oil was collected on a spatula, triturated with water, and stored at 3°C. until it solidified. The mixture was filtered, and the collected solid was washed successively with aqueous 2N potassium bicarbonate (twice), water, 5% citric acid (twice), and water (twice). The solid was air dried and then dissolved in approximately 170 ml. of hot 95% ethanol. Water (140 ml.) was added, and the product was allowed to crystallize at room temperature for 3 days. The mixture was diluted to about 300 ml. with cold ethanol, slurried, and filtered. The product was recrystallized from a mixture of 300 ml. of 95% ethanol and 50 ml. of water which was stored at 3°C. overnight. The product was filtered, washed with cold ethanol, and dried in vacuo at 40°C. overnight to obtain 12.40 g. (87%), m.p. 123°–127°C.; $[\alpha]_D = +7.1°$ (c = 0.389 TFE); $[\alpha]_D = +14.9°$ (c = 0.468 AcOH)

Analysis Calcd. for $C_{43}H_{48}N_4O_8$ (748.877): C, 68.97; H, 6.46; N, 7.48. Found: C, 68.93; H, 6.26; N, 7.28.

EXAMPLE 12 t-Butyloxycarbonyl-L-Tryptophyl-L-(O-Benzyl)-Seryl-L-(O-Benzyl)Tyrosine

To a solution of 11.23 g. (15.0 mmol.) of t-butyloxycarbonyl-L-trytophyl-L-(O-benzyl)seryl-L-(O-benzyl)tyrosine methyl ester in a mixture of 300 ml. of acetone and 100 ml. of water were added dropwise 16.5 ml. of 1.03 N lithium hydroxide in a mixture of 16.5 ml. of water and 33 ml. of acetone over a period of 35 minutes. The mixture was allowed to stand for an additional 25 minutes and then was adjusted to pH 6 by addition of 5% citric acid. The mixture was concentrated in vacuo to remove acetone, and 100 ml. of ethanol were added to clear up the gel which had formed. The mixture was acidified with 5% citric acid, cooled, and a solid precipitated. The solid was filtered and washed with water. The solid was dissolved in 100 ml. of 95% ethanol. The solution was cooled, 20 ml. of water were added, and the mixture was scratched with a spatula. A gel precipitated. The gel was filtered and dried in vacuo at 30° C. The solid was crystallized from 100 ml. of hot acetonitrile, filtered, and dried in vacuo at 40°C. to obtain 9.28 g. (84.2%) of product, m.p. 145°–155°C. (dec.). The product was purified by recrystallization from acetonitrile to obtain 8.54 g. (77%), m.p. 146°–157°C. (dec.).

Analysis Calcd. for $C_{42}H_{46}N_4O_8$ (734.850): C, 68.65; H, 6.31; N, 7.62; O, 17.42. Found: C, 68.43; H, 6.53; N, 7.38; O, 17.14.

EXAMPLE 13 t-Butyloxycarbonyl-L-Tryptophyl-L-(O-Benzyl)Seryl-L-(O-Benzyl)Tyrosyl-D-Alanyl-L-Leucyl-L-Nitroarginyl- L-Proline-N-Ethylamide A solution of 1.122 g. (2.2 mmol.) of D-alanyl-L-leucyl-L-nitroarginyl-L-proline-N-ethylamide, 1.617 g. (2.2 mmol.) of t-butyloxycarbonyl-L-tryptophyl-L-(O-benzyl)seryl-L-(0-benzyl)- tyrosine, and 0.297 g. (2.2 mmole) of 1-hydroxybenzotriazole in 8 ml. of N,N-dimethylformamide was prepared. The solution was cooled to −15°C. To the solution was added 0.516 g. (2.5 mmol.) of N,N'-dicyclohexylcarbodiimide in 2 ml. of cold N,N-dimethylformamide. This solution was stirred at 5°C. for 99 hours. The resulting insoluble material was filtered from the mixture and discarded. To the filtrate were added 2 ml. of a 2:1:3 mixture of pyridine, acetic acid, and water. The mixture was stirred briefly at room temperature and then was chilled. More insoluble material was filtered and discarded. Aqueous 2N potassium bicarbonate was added to the filtrate with swirling. A precipitate began to form and was aided by addition of water. The mixture was chilled at 5°C., water was added, and the solid was collected. The solid was crystallized from boiling 95% ethanol. The product was collected with cold 95% ethanol and was washed well with 1N sodium bicarbonate and water. The pure product was dried in vacuo to obtain 1.290 g. (47%), m.p. 202.5–205°C. (dec.).

Analysis Calcd. for $C_{64}H_{83}N_{13}O_{13}$: C, 61.77; H, 6.88; N, 14.63; O, 16.72. Found: C, 61.65; H, 7.11; N, 14.42; O, 16.46.

Amino Acid Analysis (Based on Leucine = 1) Found: Trp 0.87; Ser 0.79; Tyr 1.06; Ala 1.0; Leu 1; Arg 0.95; Pro 1.0.

EXAMPLE 14

L-Tryptophyl-L-(O-Benzyl)Seryl-L-(O-Benzyl)-Tyrosyl-D-Alanyl-L-Leucyl-L-Nitroarginyl-L-Proline-N-Ethylamide A suspension of 1.244 g. (1 mmol.) of t-butyloxycarbonyl-L-tryptophyl-L-(O-benzyl)seryl-L-(O-benzyl)tyrosyl-D-alanyl-L-leucyl-L-nitroarginyl-L-in 10 ml. of an 8:1:1 mixture of trifluoroacetic acid, triethylsilane, and methylene chloride was stirred at room temperature for 35 minutes during which time solution occurred. The solution was evaporated in vacuo to an oil. Ether was added, and a gel formed. The mixture was evaporated in vacuo, and the residue was dissolved in N,N-dimethylformamide. Aqueous 2N potassium bicarbonate and water were added, and a precipitate formed. The mixture was chilled at 5°C., water was added, the solid was collected. The resulting dried solid was dissolved in a small amount of 95% ethanol, and the solution was chilled. Ether was added, and product began to crystallize. The product was collected with cold ether and dried in vacuo. Thin layer chromatography in 3 systems indicated good product with no trace of starting material. The yield of pure product was 0.820 g. (72%), m.p. 135°–138°C. (dec.).

Amino Acid Analysis (Based on Leucine = 1) Found: Trp 0.80; Ser 0.88; Tyr 1.02; Ala 1.02; Leu 1; Arg 1.06; Pro 1.03.

EXAMPLE 15

Benzyloxycarbonyl-L-Pyroglutamyl-L-Tryptophyl-L-(O-Benzyl)Seryl-L-(O-Benzyl)Tyrosyl-D-Alanyl-L-Leucyl-L-

A solution of 0.377 g. (0.33 mmol.) of L-tryptophyl-L-(O-benzyl)seryl-L-(O-benzyl)tyrosyl-D-alanyl-L-leucyl-L-nitroarginyl-L-proline-N-ethylamide in 2 ml. of N,N-dimethylformamide was prepared. To this solution was added 0.131 g. (0.363 mmol.) of benzyloxycarbonyl-L-pyroglutamine N-hydroxysuccinimide ester in 1 ml. of N,N-dimethylformamide. The mixture was stirred at room temperature for 166 hours during which time solution occurred. Water was added sufficient to increase the volume to 20 ml., and precipitation occurred. The crude product was chilled, collected with water, and air dried. The solid was dissolved in a small amount of boiling 95% ethanol, and the solution was chilled at 5°C. for several days. The product was filtered and dried in vacuo. The yield of pure product was 0.335 g. (73%) m.p. 165–168°C.

Analysis Calcd. for $C_{72}H_{86}N_{14}O_{15}$: C, 62.32; H, 6.25; N, 14.13; O, 17.30. Found: C, 62.50; H, 6.39; N, 13.84; O, 16.81.

Amino Acid Analysis (Based on Leucine = 1) Found: Glu 1.04; Trp 0.58; Ser 0.88; Tyr 0.98; Ala 1.0; Leu 1; Arg 0.98; Pro 1.05.

EXAMPLE 16

L-Pyroglutamyl-L-Trytophyl-L-Seryl-L-Tyrosyl-D-Alanyl-L-Leucyl-L-Arginyl-L-Proline-N-Ethylamide A solution of 0.200 g. (0.144 mmol.) of benzyloxycarbonyl-LL-pyroglutamyl-L-tryptophyl-L-(O-benzyl)seryl-L-(O-benzyl)tyrosyl-D-alanyl-L-leucyl-L-nitroarginyl-L-proline-N-ethylamide and 0.077 g. (0.405 mmol.) of p-toluenesulfonic acid monohydrate in 15 ml. of N,N-dimethylformamide was prepared. To this solution was added 0.4 g. of 5% palladium on carbon (Pd/C) catalyst in 35 ml. of N,N-dimethylformamide. The mixture was hydrogenated at room temperature for 64 hours.

The mixture was filtered, and the filtrate was evaporated in vacuo to an oil. Ether was added to the oil, but the product failed to solidify. The mixture was evaporated in vacuo to a foam, and the foam was dissolved in acetic acid and diluted with 1M acetic acid. The resulting solution was lyophilized to dryness. The fluffy solid was dissolved in 1 ml. of acetic acid and diluted with 5 ml. of 1M acetic acid. The solution was then applied to a Sephadex G-15 column. Chromatographic conditions were as follows: solvent, 1M acetic acid (at 4°C.); column size, 2.5 × 180 cm.; flow rate, 30 ml./hour; fraction volume, 10 ml.

Absorbance at 280 m$\mu$ of each fraction plotted versus fraction number indicated 3 separable peaks. A collection of 3 sets of fractions was made.

Fractions combined and their eluant volumes were:
Fractions 42–49 (427–507.5 ml.)
Fractions 74–85 (747.5–867.5 ml.)
Fractions 92–107-(927.5–1087.5 ml.)

Each of the 3 collections was lyophilized and collected. Weights recorded were 19.6 mg., 17.4 mg., and 59.2 mg. The second sample was the purest product, having an amino acid analysis (Based on Leucine = 1) as follows: Glu 1.02; Trp 0.90; Ser 0.90; Tyr 1.04; Ala 1.0; Leu 1; Arg 1.01; Pro 1.06.

ASSAY OF THE OCTAPEPTIDE

To each of 38 10 ml. culture tubes were added two halves of anterior pituitaries removed from male rats and 2 ml. of commercially available Medium 199. The 38 tubes were grouped into 19 pairs, each pair of which received pituitary from the same rats. The pituitaries were preincubated in the culture tubes for 1 hour at 37°C. in a Dubnoff metabolic shaker. At the end of 1 hour the preincubation medium was discarded, and 2 ml. of fresh medium containing 10 ng. of synthetic LH-RH were added to each tube. Additionally, to one culture tube of each pair were added 10 $\mu$g. of the inhibitor octapeptide of this invention. The tube pairs were incubated for 4 hours, and the Medium in each was collected and assayed for LH by radioimmunoassay.

In 16 of the 19 pairs, an inhibition of LH release was noted. Those tubes which received only LH-RH exhibited an average LH release of 2698.5 ng./mg. of pituitary (s.e. = ±868.6 ng. LH; student's t-test = 3.106.).

The average inhibition demonstrated by the LH released in those tubes which additionally received the octapeptide of this invention was −851.1 ng./mg. of pituitary (s.e. = ±195.6 ng. LH; student's t-test = 4.35; $P < 0.001$).

I claim:
1. A compound of the formula

L-PyroGlu-L-Trp-L-Ser-L-Tyr-D-Ala-L-Leu-L-Arg-L-Pro-NHCH$_2$CH$_3$ and its pharmaceutically acceptable acid addition salts.

2. A compound of the formula

R$_3$-L-Trp-L-(Bzl)Ser-L-(R$_2$)Tyr-D-Ala-L-Leu-L-(R)Arg-L-Pro-NHCH$_2$CH$_3$ in which R is nitro or tosyl; R$_2$ is benzyl or 2,5-dichlorobenzyl; and R$_3$ is H-, tert-BOC-, PMBOC-, BPOC-, or R$_4$ -L- PyroGlu- in which R$_4$ is H-, CBz-, or PMBOC-.

3. A compound of claim 2, in which R is nitro; R$_2$ is benzyl; and R$_3$ is H-, tert-BOC-, or CBz-L-PyroGlu-.

* * * * *